United States Patent [19]

Bosworth et al.

[11] Patent Number: 4,655,799

[45] Date of Patent: Apr. 7, 1987

[54] PULSE CLEANING SYSTEM FOR DUST FILTERS

[75] Inventors: Michael A. Bosworth, Nemaha, Kans.; Richard L. Adams, Clay, Mo.; Bruce Wheaton, Hennepin, Minn.

[73] Assignee: MAC Equipment, Inc., Sabetha, Kans.

[21] Appl. No.: 885,237

[22] Filed: Jul. 14, 1986

Related U.S. Application Data

[63] Continuation of Ser. No. 698,686, Feb. 6, 1985, abandoned.

[51] Int. Cl.$^4$ .............................................. B01D 46/04
[52] U.S. Cl. ..................................... 55/273; 55/287; 55/294; 55/302
[58] Field of Search ........... 55/273, 294, 302, 283–288

[56] References Cited

U.S. PATENT DOCUMENTS

| | | | |
|---|---|---|---|
| 3,487,609 | 1/1970 | Caplan | 55/96 |
| 3,951,627 | 4/1976 | Barr et al. | 55/284 |
| 4,157,899 | 6/1979 | Wheaton | 55/273 |
| 4,233,041 | 11/1980 | Noland | 55/287 |

Primary Examiner—Charles Hart
Attorney, Agent, or Firm—Kokjer, Kircher, Bradley, Wharton, Bowman & Johnson

[57] ABSTRACT

A cleaning system for dislodging dust from the filter bags of a dust filter having dirty and clean air plenums separated by a tube sheet. The tube sheet is divided into segments each having filter bag openings arranged in the same pattern. An air accumulator tank which continuously receives compressed air is rotated in the clean air plenum with a connected distribution arm which applies air pulses to the filter bags through discharge nozzles arranged in the same pattern as the filter bag openings. A position sensor allows cleaning air in the tank to be applied to the distribution arm only when the arm is aligned above a segment with all nozzles centered on the filter bags. A quick acting diaphragm valve is combined with the air tank to control air flow into the distribution arm at a location adjacent to the arm to minimize the response time.

16 Claims, 7 Drawing Figures

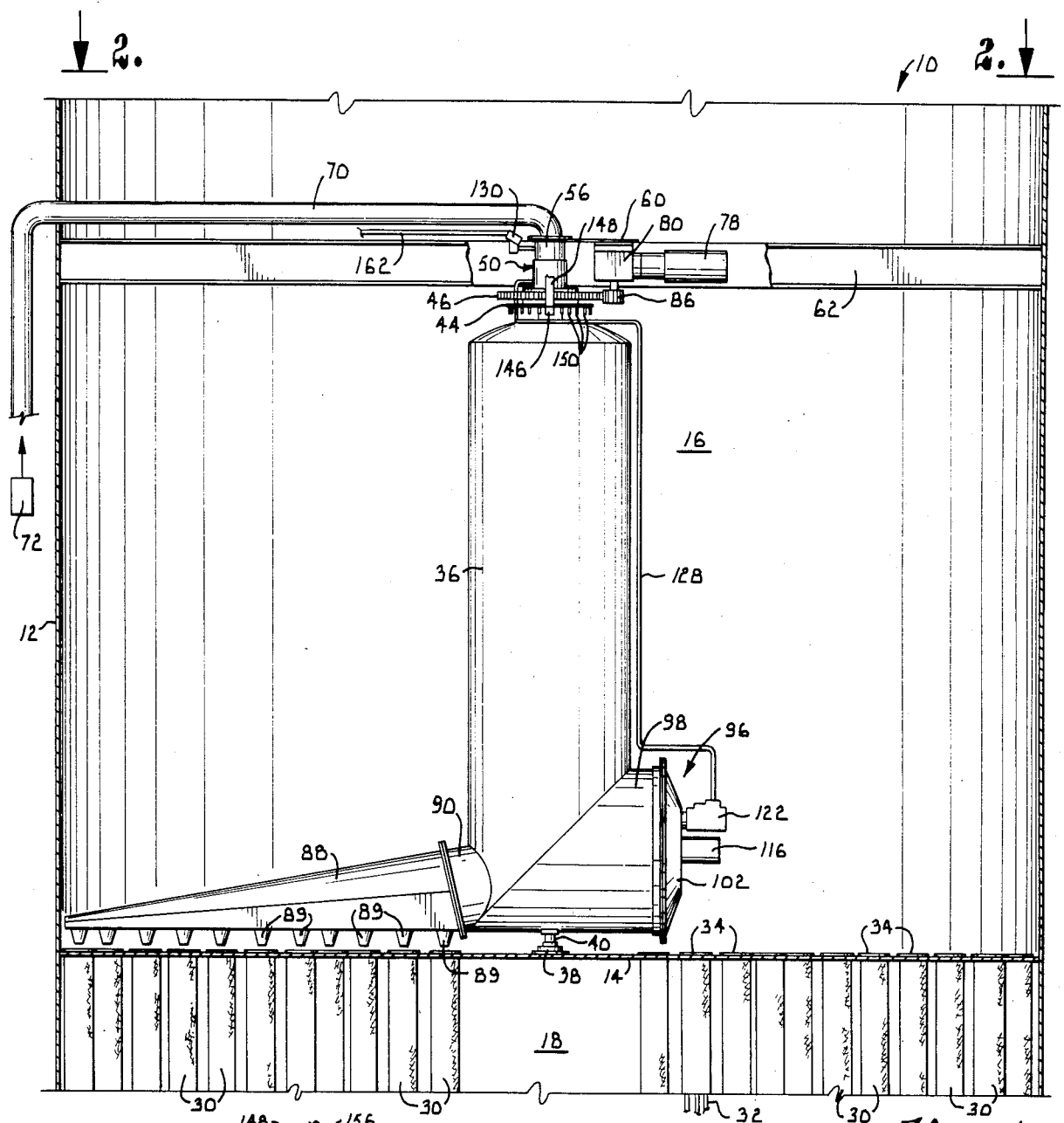
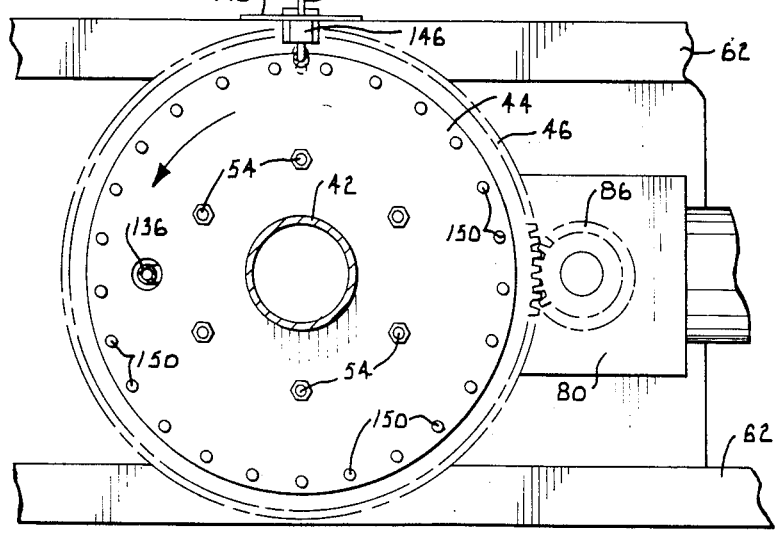
Fig. 1.
Fig. 4.

PULSE CLEANING SYSTEM FOR DUST FILTERS

This is a continuation, of application Ser. No. 698,686, filed Feb. 6, 1985, and now abandoned.

BACKGROUND OF THE INVENTION

This invention relates in general to the filtration of dust laden gases and more particularly to a bag type dust filter having an improved system for cleaning f the filter bags.

In bag type dust filtration equipment, dust laden air is passed through a bank of filter bags which remove the dust. In this particular type filter, the bags are normally suspended from a tube sheet located between an underlying dirty air plenum and an overlying clean air plenum. The dust laden air is drawn into the dirty air plenum and through the filter bags into the clean air plenum from which the filtered air is discharged. The dust which is removed from the air collects on the outside surfaces of the filter bags and must be periodically dislodged to maintain the bags in condition to effectively perform their filtering function. When the filter housing is cylindrical, cleaning of the filters is often performed by a rotating arm which applies pulses of reverse flowing air through the bags to remove the accumulated dust. This type of cleaning system is generally shown in U.S. Pat. No. 4,157,899 to Wheaton.

Cleaning of the filter bags with a radial cleaning arm presents a number of difficulties which are caused in part by the geometry. The cleaning arm normally has a single row of discharge nozzles for applying the air pulses. However, it is not desirable to arrange the filter bags in rows extending along radial lines on the tube sheet because this type of arrangement spaces the bags in the outer rings so far apart that effective use of the tube sheet area is not made. If the filter bags are arranged to achieve efficient filtration, they are not located on common radials and the cleaning arm is not able to clean all of the filters in a uniform manner. If air is applied to the cleaning arm while some of its discharge nozzles are misaligned with the underlying bags, at least some of the cleaning air is wasted because it is directed against the surface of the tube sheet where it does not good. When the air is discharged randomly from the arm, the effectiveness of the cleaning air application to any one bag is purely a matter of chance, and the uniformity of the cleaning operation suffers accordingly.

Flow losses have also detracted from the cleaning efficiency. The cleaning air is typically accumulated in a tank that may be located some distance from the cleaning arm. Because of the distance the compressed air must travel between the tank and arm, there are significant flow losses. The distance between the accumulator tank and the cleaning arm also increases the response time of the system, resulting in a delay between opening of the main valve and application of the cleaning air pulses to the filter bags.

SUMMARY OF THE INVENTION

The present invention provides a pulse cleaning system in which the air accumulator tank is located adjacent to the cleaning arm in order to decrease both the response time and the flow losses. At the same time, the cleaning operation is accurately controlled to apply equal pulses to all filter bags at the same frequency so that uniform cleaning of all bags is assured.

In accordance with the invention, the tube sheet is divided into identical pie shaped segments, and each segment has its filter bag openings arranged in the same pattern. The discharge nozzles on the radial cleaning arm are arranged in a pattern which is identical to the pattern of the filter bags on each segment of the tube sheet. As the cleaning arm rotates, it is aligned above the successive segments and all of its nozzles are directly centered on all of the filter bags on the underlying segment when the cleaning pulses are applied. Consequently, all of the cleaning air is used effectively to clean the filters, and the filters are uniformly cleaned because each filter bag receives a pulse applied with the same force and frequency as the pulses applied to all other bags.

Another important feature of the invention is the location of the air accumulator tank and main valve adjacent to the cleaning arm. The tank is mounted in the clean air plenum for rotation about an axis coincident with the center of the tube sheet, and the tank thus serves as a structural part of the rotation system for the arm. A large gear is mounted on top of the tank and is driven by an electric drive motor to rotate the tank and the connected cleaning arm at a constant speed. A stationary supply line continuously supplies compressed air to the rotating tank through a rotary union which also uniquely accommodates a pilot line controlled by a solenoid valve. Flow from the tank into the cleaning arm is controlled by a diaphragm valve which is in turn controlled by a secondary valve that the solenoid valve opens and closes in accordance with the rotational position of the arm. The valve system is quick acting and is located as close as possible to the cleaning arm so that flow losses and response time are minimized.

The control system includes a position sensor which provides a signal each time the cleaning arm is aligned directly above one of the segments of the tube sheet. As an example, the solenoid valve is preferably actuated each time three signals are generated in order to provide sufficient time for the necessary pressure to build up in the accumulator tank and to reduce adjacent bag redeposition of dust. When the solenoid valve is actuated, it opens the secondary valve and the main diaphragm valve in rapid succession to apply air pulses through the cleaning nozzles while they are exactly centered on the underlying filter bags. This exact alignment between the nozzles and filters assures effective use of every air pulse. At the same time, the filter bags are cleaned uniformly because each bag receives one cleaning pulse for every three revolutions of the cleaning arm. The number of signals generated prior to pulsing can be varied, depending on the air filter size and configuration.

DETAILED DESCRIPTION OF THE INVENTION

In the accompanying drawings which form a part of the specification and are to be read in conjunction therewith and in which like reference numerals are used to indicate like parts in the various views:

FIG. 1 is a fragmentary sectional view taken on a vertical plane through a dust filter equipped with a pulse cleaning system constructed according to a preferred embodiment of the invention, with portions broken away for purposes of illustration;

FIG. 4 is a fragmentary view taken generally along line 4—4 of FIG. 3 in the direction of the arrows;

Figure 2:
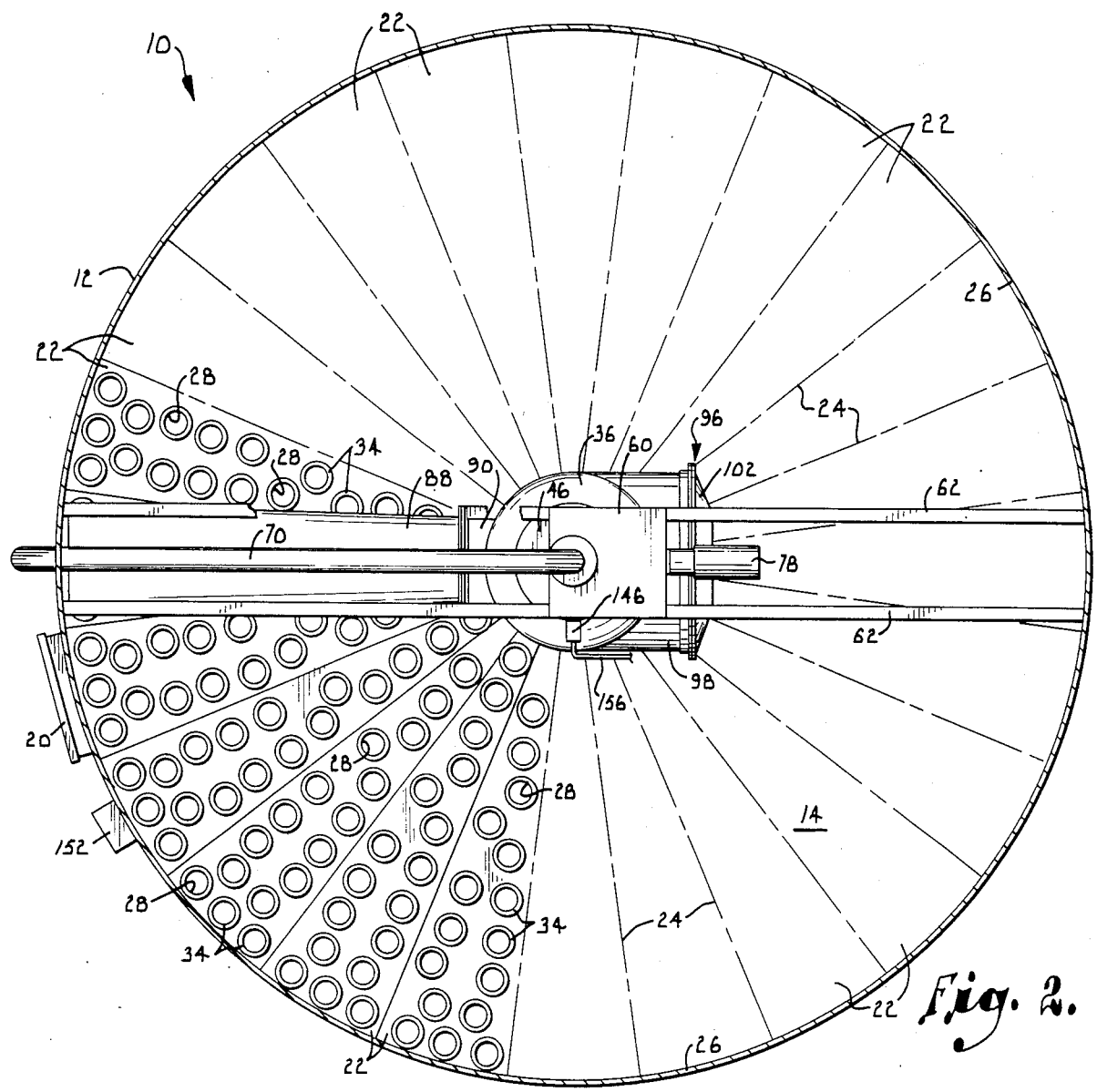
FIG. 2 is a sectional view taken generally along line 2—2 of FIG. 1 in the direction of the arrows.

Referring now to the drawings in more detail and initially to FIG. 1, numeral 10 generally designates a bag type dust filter. A sheet metal housing 12 has a cylindrical configuration and may be supported by suitable support legs (not shown). A circular tube sheet 14 is secured at its periphery to the housing 12 and forms a horizontal partition which divides the housing 12 into two chambers or plenums 16 and 18. The plenum 16 located above the tube sheet is referred to as a clean air plenum, and the plenum, 18 below the tube sheet is referred to as a dirty air plenum. A conical hopper (not shown) is normally provided on the bottom of the dirty air plenum 18 for collection of the dust that is removed during operation of the dust filter 10. An auger or other conveyor system (also not shown) conveys the dust away from the collection hopper. An access door 20 (see FIG. 2) in the side of housing 12 provides access to the clean air plenum 16.

As best shown in FIG. 2, the circular tube sheet 14 is divided into a number of adjacent pie shaped segments 22. Each segment 22 is bounded by a pair of radials 24 extending from the center of the tube sheet and a chord 26 on the periphery of the tube sheet. All of the segments 22 are identical in size and shape. There are twenty five segments in the embodiment of the invention shown in FIG. 2, although different numbers can be selected.

A plurality of openings 28 are formed through the tube sheet 14 and are arranged in a plurality of concentric rings centered at the center of the tube sheet. Each opening 28 receives a filter bag 30 formed by a fabric bag fitted on a cage 32 (see FIG. 1) which provides skeletal support for the fabric bag. An enlarged collar 34 is provided on the top end of each filter bag 30 and rests on the top surface of the tube sheet 14 to suspend the bags 30 from the tube sheet. The filter bags 30 extend from the tube sheet into the dirty air plenum 18 and serve to filter dust from the dust laden air which passes from the dirty air plenum 18 into the clean air plenum 16.

Each segment 22 of the tube sheet has the same number of openings 28, and the openings are arranged on each segment in the same pattern, which is shown in FIG. 2. At the locations of several of the inner concentric rings of openings 28, the segments 22 are wide enough to accommodate only a single opening 28 and associated filter bag 30. The segments are wider at the locations of the outer rings, and each segment is provided with two or more openings 28 at the locations of the outer rings of openings. The outermost set of openings in each segment 22 includes three openings 28. Each segment 22 is preferably provided with as many openings and filter bags as possible while still accommodating the arrangement of the openings in concentric rings and maintaining adequate space between adjacent openings. It is to be understood that patterns different from that shown in FIG. 2 are possible.

In accordance with the present invention, an air accumulator tank 36 is mounted for rotation in the clean air plenum 16. Tank 36 serves as a reservoir for the compressed air which is used to clean the filter bags 30. Tank 36 has a generally cylindrical body, and its axis of rotation passes centrally through the tank and coincides with the center of the circular tube sheet 14. A bearing 38 is mounted on the center of the tube sheet and receives a short shaft 40 projecting from the bottom of the air accumulator tank 36.

Figure 3:
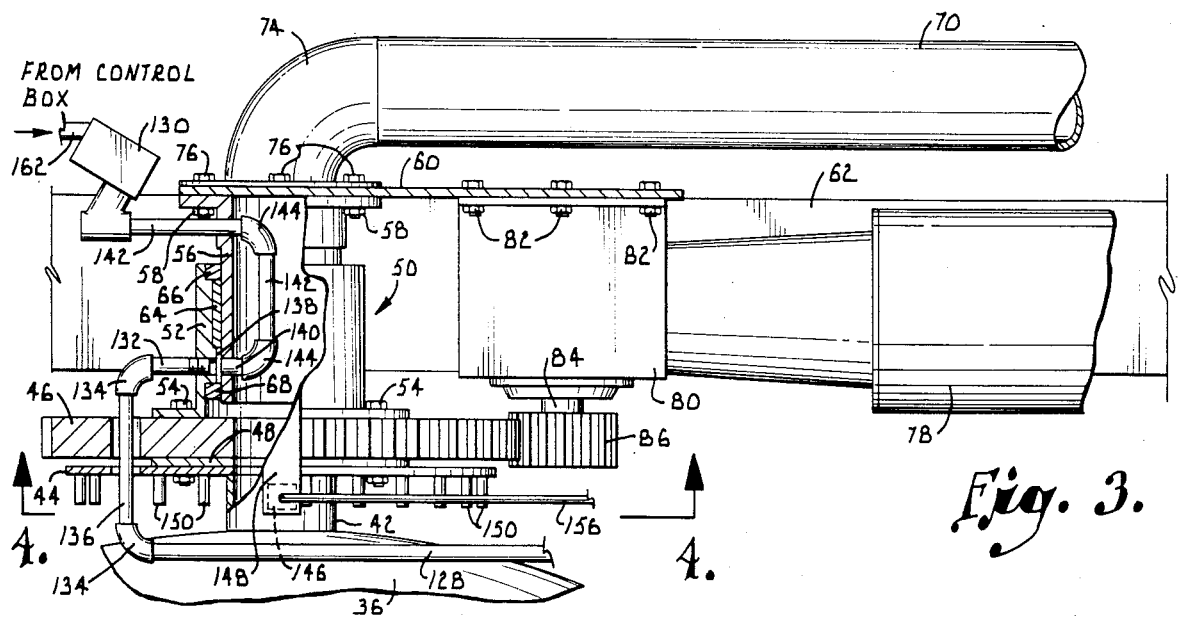
FIG. 3 is a fragmentary sectional view on an enlarged scale showing the gear drive arrangement and related components near the top end of the air accumulator tank.

As shown in FIG. 3, air is applied to the accumulator tank 36 through an inlet pipe 42 extending centrally from the top of the tank. At its top end, pipe 42 is secured to a circular peg wheel 44. A large gear 46 overlies the peg wheel 44 and is separated therefrom by a thin spacer disk 48. A rotary unitl 50 has a cylindrical outer body 52 which is flanged at its lower end and secured by bolts 54 to the gear 46, spacer 48 and peg wheel 44. Body 52 receives and rotates on a somewhat smaller sleeve 56 which is flanged on its top end and bolted at 58 to a rectangular mounting plate 60. The mounting plate 60 is in turn mounted on a pair of parallel channels 62 which extend across the housing 12 and are secured thereto at their opposite ends, as best shown in FIG. 2.

Referring again to FIG. 3, a bronze bushing 64 is interposed between the rotating body 52 and the stationary sleeve 56, as are upper and lower seal rings 66 and 68. The centers of gear 46, spacer 48 and peg wheel 44 are open to provide communication between sleeve 56 and the inlet pipe 42.

A stationary supply pipe 70 receives compressed air from a positive displacement type air pump 72 (see FIG. 1). The end of pipe 64 opposite the pump 72 connects with an elbow 74 which is flanged at its lower end and connected to the mounting plate 60 by bolts 76. The elbow 74 is aligned with sleeve 56 in order to apply compressed air to the sleeve and to the air accumulator tank 36 through its inlet pipe 42. The rotary union 50 allows tank 36 to rotate about its vertical aixs of rotation and at the same time to continuously receive compressed air from the stationary supply pipe 64.

The tank 36 is rotated by an electric motor 78 which drives a speed reducer 80 bolted at 82 to the underside of the mounting plate 60. The speed reducer 80 drives an output shaft 84 which carries a pinion gear 86 that mates with and drives the larger gear 46. The motor 78 is energized continuously during operation of the air pulse cleaning system and preferably drives tank 36 at a fixed constant rotational speed selected within the range of about one half to two revolutions per minute.

Figure 5:
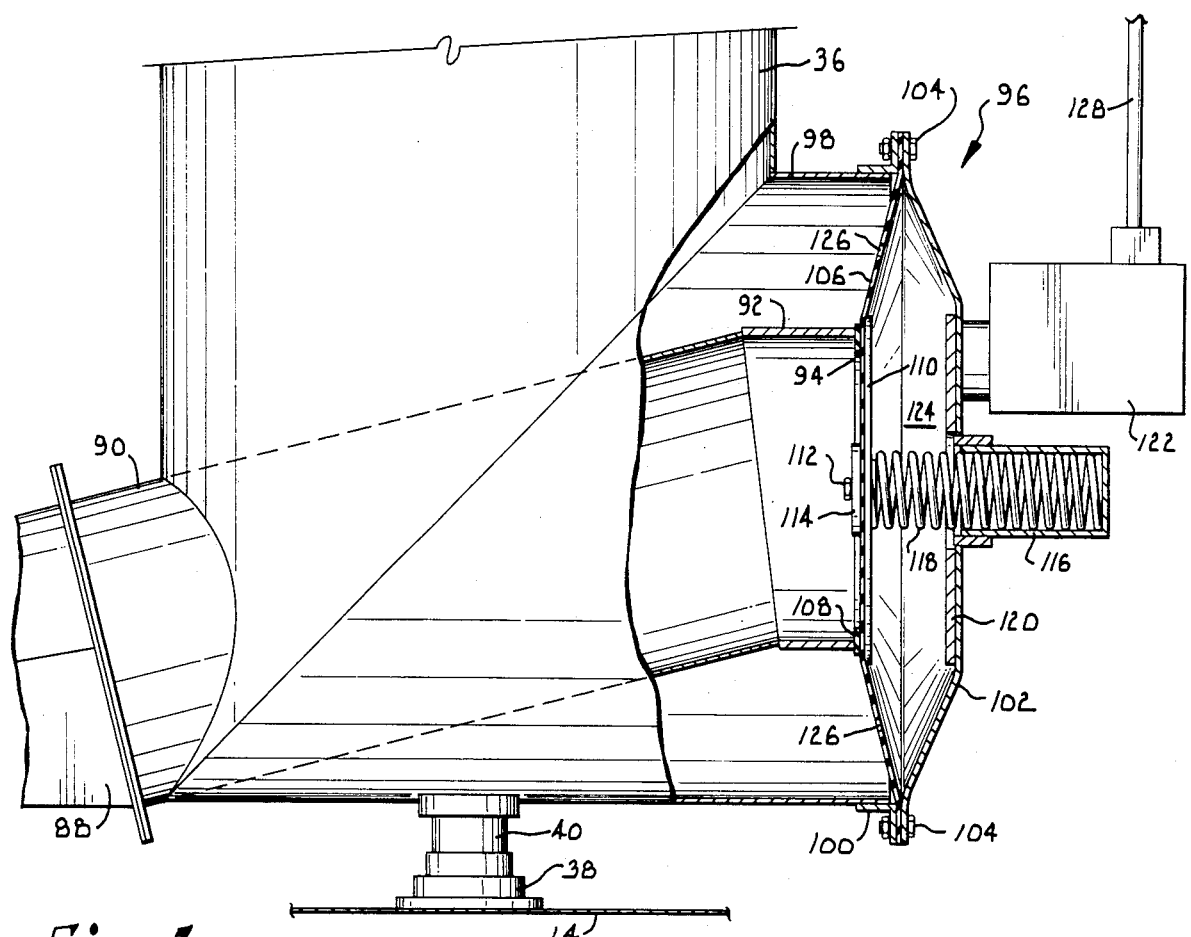
FIG. 5 is a fragmentary elevational view on an enlarged scale showing the main diaphragm valve and related parts of the pulse cleaning system, with the diaphragm in the closed position and portions broken away for purposes of illustration.

The air that is accumulated in the tank 36 is applied to the filter bags 30 by an air distribution arm 88 having a plurality of discharge nozzles 89. Arm 88 is generally horizontal and extends radially above tube sheet 14 from one side of the air accumulator tank 36. The arm 88 tapers as it extends away from tank 36 and is flanged at its inner end to connect with a flanged pipe 90 which forms the inlet to arm 88. As best shown in FIG. 5, pipe 90 extends into the bottom portion of tank 36 and is secured to the tank, as by welding. Pipe 90 is inclined from horizontal and is provided with a horizontal inlet fitting 92 on the end opposite the flanged end. The fitting 92 provides an inlet 94 to arm 88 which is located within tank 36.

The discharge nozzles 89 are equal in number to the openings 28 on each segment and are arranged on arm 88 in the same pattern as the filter bag opening 28 are arranged on each segment 22 of the tube sheet. Consequently, as arm 88 rotates about the center of the tube sheet, nozzles 89 are successively aligned above the openings 28 in each of the segments 22. Each nozzle 89 preferably has the same size as all other nozzles to apply cleaning pulses with the same force from each nozzle.

Numeral 96 generally designates a main diaphragm valve which controls the entry of air through the distribution arm inlet 94. A cylindrical housing 98 projects to one side of tank 36. The housing 98 surrounds and is concentric with the inlet fitting 92. An angle 100 is welded or otherwise secured to the end of housing 98. A valve head 102 covers the end of housing 98 and is secured to the angle 100 by bolts 104. The bolts also secure the periphery of a flexible diaphragm 106 between the angle 100 and valve head 102.

Figure 6:
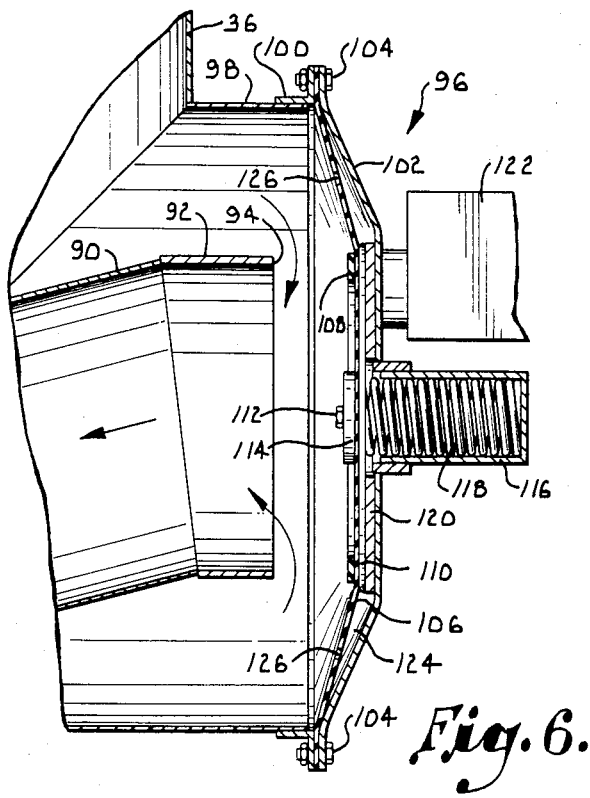
FIG. 6 is a fragmentary view similar to FIG. 5, but showing the diaphragm in the open position.

The flexible diaphragm 106 moves between the closed position of FIG. 5 and the fully open position of FIG. 6. In the closed position, a neoprene ring 108 forms a seat which seals against the edge of the inlet fitting 92 to close inlet opening 94. The ring 108 is suitably secured to the inner face of diaphragm 106. A circular backing plate 110 is secured centrally to the outer face of diaphragm 106 by a bolt 112 that engages a washer 114. Plate 110 is slightly larger in diameter than fitting 94.

A tube 116 which projects from the valve head 102 receives a coil spring 118. The spring 118 normally extends out of tube 116 and is secured at its end to the backing plate 110. The force appllied to diaphragm 106 by spring 118 continuously urges the diaphragm toward the closed position. A circular bumper 120 is secured to the inside surface of the valve head 102 and is engaged by the backing plate 110 in the open position of the diaphragm. In the open position, inlet 94 is fully exposed so that air can pass through it into the distribution arm.

The main diaphragm valve 96 is controlled by a secondary diaphragm valve 122 which connects through the valve head 102 with a pressure chamber 124 located between the valve head and diaphragm. When the secondary valve 122 is closed, high pressure air is retained in the valve chamber 124 to cooperate with spring 118 in holding diaphragm 106 in the closed position. The diaphragm 106 is provided with a series of small bleed holes 126 which are located outside of the backing plate 110 and which transmit high pressure air from tank 36 into the pressure chamber 124. When the secondary valve 122 is opened, it quickly exhausts the high pressure air from chamber 124, and the pressure in tank 36 acts against the inner face of diaphragm 106 and overcomes spring 118 to move the diaphragm to the open position.

The secondary valve 122 is controlled by a pneumatic pilot line 128 which is in turn controlled by a solenoid valve 130. As best shown in FIG. 3, the pilot line 128 connects with a threaded tube 132 through a pair of elbows 134 and a short vertical pipe 136. Pipe 136 extends through aligned openings formed in the peg wheel 44 and the large gear 46. Tube 132 is threaded into the body 52 of the rotary union 50 and communicates with an annular chamber 138 formed between body 52 and the inner sleeve 56 of the rotary union. A short nipple 140 is fitted through sleeve 56 and is in communication with chamber 138. The nipple 140 connects with the solenoid valve 130 through a pair of pipes 142 and elbows 144. When the solenoid valve is closed, it maintains the pressure in the pilot line 128 which in turn maintains the secondary valve 122 in the closed condition. However, when the solenoid valve 130 opens, the pressure in the pilot line is exhausted and the secondary valve 122 opens to exhaust the pressure chamber 124 of the main diaphragm valve.

The control system which actuates the solenoid valve 130 includes a proximity sensor 146. The proximity sensor is mounted on a bracket 148 at a location adjacent to the periphery of the peg wheel 44, as best shown in FIG. 4. Extending downwardly from the lower face of the peg wheel 44 near its periphery are a plurality of pegs 150 which are arranged in a circle centered on the rotational axis of the accumulator tank 36. There are the same number of pegs 150 as there are segments 22 on the tube sheet 14. The pegs 150 are spaced equidistantly apart and are located such that each time a peg is adjacent to the proximity sensor 146, the distribution arm 88 is aligned above the corresponding segment 22 with the discharge nozzles 89 centered on the underlying openings 28 and filter bags 30. The proximity sensor 146 is a conventional unit which senses when a peg is adjacent to it and generates an electrical signal each time it senses the presence of a peg.

Figure 7:
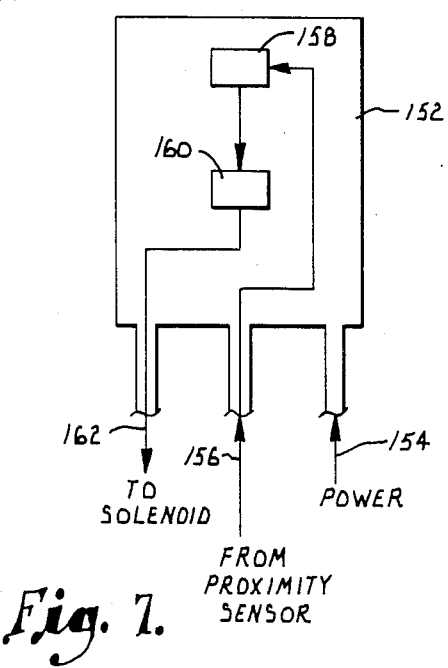
FIG. 7 is a diagrammatic view of the control box for the pulse cleaning system.

With particular reference to FIG. 7, a control box 152 mounted on the filter housing 12 recieves electrical power applied to a conductor 154. Another conductor 156 leads from the proximity sensor 146 to a counter 158 located in the control box 152. The counter 158 counts the electrical signals generated by the proximity sensor. When the counter is advanced to a preselected count state (such as 3), it activates a pulse generator 160 located within the control box. The pulse generator is electrically connected with the solenoid valve 130 by a conductor 162. When activated by counter 158, the pulse generator applies an output signal which opens the solenoid 130. The counter 158 is reset each time it activates the pulse generator 160.

In operation of the dust filter, a blower (not shown) draws dust laden air or other gas into the dirty air plenum 18 and through the filter bags 30 into the clean air plenum 16 from which the filtered air is discharged. The air pulse cleaning system of the present invention operates to dislodge the dust which accumulates on the outside surfaces of the filter bags 30 during the filtering operation.

As previously indicated, the drive motor 78 is continuously energized to rotate tank 36 and the attached distribution arm 88 at a constant rotational speed (one revolution per minute, for example). As arm 88 rotates, it is moved from one segment 22 to the next segment and is aligned above the successive segments such that the discharge nozzles 89 are momentarily centered on the openings 28 and filter bags 30 of each segment 22.

Each time the arm 88 is aligned above one of the segments 22, the corresponding peg 150 is adjacent to and is sensed by the proximity sensor 146. The proximity sensor then applies a signal to the counter 158, and each signal increments by one the count state of the counter until its preselected count state is reached. For example, if a count state of three is selected, the third peg 150 which reaches the proximity sensor 146 causes counter 158 to activate on the pulse generator 160 and to reset to zero. The pulse generator then applies a signal to the solenoid 130 which opens the solenoid valve to exhaust the pilot line 128. The pressure reduction in the pilot line in turn opens the secondary valve 122 to exhaust air from the pressure chamber 124 of the main diaphragm valve 96. Since compressed air is continuously applied to the accumulator tank 36, the pressure in the accumulator tank builds up to a sufficient level (such as 7 psi) to open the diaphragm 106 by the time the third peg 150 is sensed. When the pressure chamber 124 is exhausted by the secondary valve 122, the pressure in tank 36 acting against the diaphragm 106 overcomes the force of spring 118 and moves diaphragm 106 to the fully open position shown in FIG. 6.

When the diaphragm opens, the compressed air in tank 36 quickly enters inlet 94 and flows through fitting 92 and pipe 90 into the distrubition arm 88. The accumulated air is discharged in a single sharp blast which is applied through all of the nozzles 89 with substantially equal force. Since the nozzles 89 are at this time centered over the openings 28 of the underlying segment 22, all of the air which is applied to the distribution arm 88 is discharged through the filter bags 30 to dislodge accumulated dust from the outside surfaces of the bags.

The solenoid 130 is opened only momentarily. When the pressure in the accumulator tank 36 drops sufficiently, spring 118 returns diaphragm 106 to the fully closed position shown in FIG. 5. As the pressure builds up again in the accumulator tank, air is able to bleed through the bleed holes 126 into the high pressure chamber 124, and the diaphragm remains closed until the solenoid valve 130 is opened again after three more pegs have been sensed by the proximity sensor.

In this manner, the pulse cleaning system operates to apply a single air pulse through each of the discharge nozzles 89 each time arm 88 reaches the end of a rotational increment. At the beginning of each cycle, the diaphragm 106 of the main diaphragm valve closes and pressure builds up in the accumulator tank 36 as the distribution arm 88 rotates through the increment covered during the cycle. The pressure continues to build in the accumulator tank until the distribution arm 88 has passed over two segments 22 and is aligned above the third segment at the end of the increment. Then, the control system opens the solenoid 130 and the secondary valve 122 and main valve 98 in rapid succession to apply air pulses to the filter bags through the discharge nozzles 89.

In order to provide sufficient time for the pressure to build up to the required level in the accumulator tank 36, and to minimize redeposition, it is preferred to clean only one third of the filter bags 30 during each full revolution of the distribution arm 88. Another one third of the filter bags are cleaned during the next revolution, and the final one third are cleaned during the third revolution. Thus, each filter bag is thoroughly and assuredly cleaned during every three revolutions of the distribution arm.

All of the filter bags 30 are cleaned in a uniform manner because each bag is pulsed with the same frequency (once for every three revolutions of the distribution arm) and the air pulses are applied with approximately the same force from all of the discharge nozzles 89. Also, all of the air pulses that are applied by nozzles 89 are applied directly to the centers of the filter bags, and none of the pulses are wasted. The result is that virtually all of the compressed air is used for cleaning of the bags, and the system thus operates more efficiently than systems which apply significant amounts of air against the surface of the tube sheet.

The accumulator tank 36 and the main valve 96 are combined in a single unit which is located adjacent to the inlet end of the distribution arm 88. This arrangement minimizes the response time because the compressed air surrounds the inlet 94 and is thus already close to arm 88 at the time the diaphragm 106 is opened. A fast response time is essential if the air is to be discharged from the nozzles 89 while the nozzles remain in alignment with the underlying openings 28. The quick acting nature of the valve system also eliminates undue delay between proper positioning of the distribution arm and discharge of the air pulses. The close proximity of the accumulator tank and valve to the distribution arm has the additional benefit of minimizing flow losses. The compressed air enters inlet 94 directly from the distribution tank and flows to the arm in a substantially straight line path to avoid appreciable loss of air and resulting inefficiencies. It is also noted that the annular space between fitting 92 and housing 98 contains a large volume of compressed air to avoid unduly restricting the air flow from the tank into the distribution arm.

In addition to the foregoing advantages, the sturdy accumulator tank 36 forms a structural part of the rotation system for the distribution arm. Consequently, the tank enhances the structural integrity of the rotation system and eliminates the need to use additional structural members to provide the rotation system with the necessary strength.

From the foregoing, it will be seen that this invention is one well adapted to attain all the ends and objects hereinabove set forth together with other advantages which are obvious and which are inhereint to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. In gas filtering apparatus having dirty and clean air chambers separated by a generally horizontal partition presenting a plurality of openings each provided with a filter bag, an improved bag cleaning arrangement comprising:

an upright air accumulator tank for receiving and accumulating a supply of air under pressure;
means for mounting said tank in the clean gas chamber for rotation about a substantially vertical axis;
drive means for rotating said tank about said axis;
means for supplying air under pressure to said tank as same is rotating;
a substantially horizontal air distribution arm extending from said tank and rotating therewith in a path carrying said arm over the partition said tank providing the sole source of air flow to said arm;
a plurality of outlets spaced along said arm for discharging air therefrom in pulses, each outlet being located to successively align with openings in the partition as said arm rotates;
valve means for controlling the flow of air from said tank into said arm; and valve control means for intermittently opening and closing said valve means to allow air from the tank to enter the arm in a pulse each time said valve means is opened and to allow air to accumulate in the tank during the intervals said valve means is closed, whereby air in the tank flows into said arm and discharges in pulses through said outlets and into the filter bags to dislodge dust therefrom each time said valve means is opened.

2. The invention of claim 1, wherein said arm has an inlet end inside said tank and said valve means is operable to open and close said inlet end of the arm.

3. The invention of claim 2, wherein said valve means comprises:
a valve housing on said tank adjacent said inlet end of the arm; and
a valve member in said housing supported for movement toward and away from said inlet end to close and open same, said valve control means being operable to move the valve member toward and away from said inlet end of the arm.

4. The invention of claim 3, wherein:
said valve member includes a flexible diaphragm having a closed position wherein the diaphragm seals said inlet end of the arm and is urged away from the inlet end of the arm toward an open position by the air pressure in said tank.

5. The invention of claim 1, wherein:
a plurality of pie-shaped segments make up the partition, each segment having substantially the same size and shape;
the openings in the partition being arranged in a plurality of concentric circles centered on said axis, the openings on each segment being arranged in a preselected non-linear pattern which is substantially the same for all segments;
said outlets are arranged in said preselected pattern to register with the openings in said segments as the arm becomes aligned with the successive segments during movement of the arm along said path; and
said valve control means opens said valve means only when said arm is aligned with a segment, whereby all air discharged from the arm is applied to the filter bags.

6. The invention of claim 5, wherein said valve control means includes:
means for generating a control signal each time said arm is aligned with a segment; and
means for opening said valve means each time a preselected number of control signals is generated.

7. Apparatus for filtering dust laden gas comprising:
a first chamber for receiving the dust laden gas;
a second chamber located above the first chamber for receiving and discharging clean gas;
a generally horizontal partition separating the first and second chambers, said partition being generally circular and being constructed by a plurality of co-planar pie-shaped segments each having substantially the same size and shape;
a plurality of openings in each segment, said openings being arranged on each segment in a preselected non-linear pattern which is substantially the same for each segment;
a filter bag for each opening, said filter bags extending from the partition into said first chamber;
an air accumulator tank for receiving and accumulating a supply of air under pressure;
a generally horizontal air distribution arm for receiving air from said tank, said arm being supported in the second chamber for rotation about a substantially vertical axis centered on said partition, said tank connected with said arm for rotation therewith;
drive means for rotating said arm and tank about said axis;
a plurality of outlets in said arm for discharging air therefrom, said outlets being arranged on said arm in said preselected pattern to register with the openings in each segment when said arm is aligned above the segment;
valve means for controlling the flow of air from said tank into said distribution arm;
valve control means for opening said valve means each time the arm has reached the end of a preselected increment of rotation and for maintaining said valve means closed while the arm is moving through each increment to allow air to accumulate in said tank, said arm being aligned above one of the segments at the end of each increment to thereby apply cleaning pulses of air from said outlets into the filter bags each time said valve means is opened.

8. Apparatus as set forth in claim 7, wherein said arm has an inlet end adjacent said tank and said valve means is operable to open said inlet end when opened by said valve control means and to close said inlet end when closed by said valve control means.

9. Apparatus as set forth in claim 7, including means for mounting said tank in said second chamber for rotation about said axis, said arm having an inlet end connected with said tank and said drive means being operable to rotate said tank and arm together about said axis.

10. Apparatus as set forth in claim 9, wherein:
said inlet end of the arm is located within said tank;
said valve means includes a valve member in said tank movable toward and away from said inlet end to close and open same, said valve control means being operable to move the valve member toward and away from said inlet end.

11. Apparatus as set forth in claim 10, wherein:
said valve member includes a flexible diaphragm having a closed position wherein the diaphragm seals against said inlet end and is urged away from the inlet end of the arm to an open position by air pressure in the tank; and
said valve control means is operable to apply pressure to said diaphragm in opposition to the pressure in the tank to maintain the diaphragm in the closed position and to relieve said opposing pressure to release the diaphragm from the inlet end of the arm.

12. Apparatus as set forth in claim 7, wherein said valve control means includes:
means for sensing when the arm is aligned above a segment;
means for generating a control signal each time the arm is aligned above a segment; and
means for opening said valve means each time a preselected number of control signals is generated.

13. In gas filtering apparatus having a first chamber for receiving dust laden gas and a second chamber for discharging clean gas, the improvement comprising:
a generally horizontal partition separating the first and second chambers, said partition being substantially circular and being constructed by a plurality of pie-shaped segments each having substantially the same size and each having side edges coinciding with radials of the partition;

a plurality of openings in said partitionn arranged in a plurality of concentric rings each centered on the center of said partition, said openings being arranged on each segment in a preselected non-linear pattern which is substantially the same for all segments;

a filter bag for each opening extending from said partition into the first chamber;

an air accumulator tank for receiving and accumulating air under pressure;

an air distribution arm communicating at one end with said tank to receive air therefrom in pulses, said arm being supported in the second chamber for rotation about a substantially vertical axis centered on said partition to move along a prescribed path carrying the arm to positions aligned above the successive segments;

drive means for rotating said arm about said axis at a substantially constant rotational speed;

a plurality of outlets in said arm equal in number to the number of openings in each segment and arranged in said preselected pattern to register with all of the openings in each segment with which the arm is aligned during movement of the arm along said path;

valve means for controlling the flow of air from said tank into said arm;

position sensing means for sensing when said arm is aligned above a segment and generating a control signal each time the arm is aligned above a segment; and valve control means for opening said valve means each time a preselected number of control signals is generated and then closing said valve means, whereby air in said tank is applied to said arm in a pulse and discharged from said outlets into the filter bags in pulses for cleaning of dust on the bags.

14. The improvement of claim 13, including:

means for mounting said tank in the second chamber for rotation about said axis with said arm;

means for connecting said drive means with said tank to rotate same at said constant rotational speed; and means for continuously supplying air under pressure to said tank from a stationary air source while the tank is rotating.

15. The improvement of claim 14, wherein:

said one end of the distribution arm is located within said tank;

said valve means includes a valve member sealing against said one end of the arm in a closed position and exposing said one end in an open position; and said valve control means is operable to normally maintain said valve member in the closed position and to open said valve member in response to said preselected number of control signals.

16. The improvement of claim 13, wherein:

said concentric rings of the openings include inner rings and outer rings; and each segment has more openings in the outer rings than in the inner rings.

* * * * *